United States Patent [19]

Marabini et al.

[11] Patent Number: 5,169,073
[45] Date of Patent: Dec. 8, 1992

[54] PROCESS FOR SEPARATING AND RECOVERING LEAD, RUBBER AND COPPER WIRES FROM WASTE CABLES

[75] Inventors: Anna Marabini, Frascati; Thomas Meloy, Rome; Pei Cheng Huang, Rome; Vittorio Alesse, Rome, all of Italy

[73] Assignee: Consiglio Nazionale Delle Ricerche, Rome, Italy

[21] Appl. No.: 622,604

[22] Filed: Dec. 5, 1990

[51] Int. Cl.$^5$ .............................................. B02C 19/12
[52] U.S. Cl. ...................................... 241/20; 241/24; 241/62; 241/81; 241/DIG. 38; 209/172.5
[58] Field of Search .................. 241/16.38, 20, 24, 62, 241/81, 77; 209/172, 172.5, 173

[56] References Cited

U.S. PATENT DOCUMENTS

| | | | |
|---|---|---|---|
| 3,749,322 | 7/1973 | Reynolds | 241/DIG. 38 X |
| 4,940,187 | 7/1990 | Lee | 241/DIG. 38 X |

FOREIGN PATENT DOCUMENTS

| | | | |
|---|---|---|---|
| 2343345 | 8/1974 | Fed. Rep. of Germany | 241/24 |
| 2301901 | 9/1976 | France | 241/24 |
| 27165 | 3/1978 | Japan | 241/24 |
| 88978 | 8/1978 | Japan | 241/24 |
| 1382825 | 2/1975 | United Kingdom | 241/24 |

*Primary Examiner*—Mark Rosenbaum
*Attorney, Agent, or Firm*—Oliff & Berridge

[57] ABSTRACT

The present invention relates to a process for separating and recovering copper wires, lead grains coming and rubber grains coming from waste cables, through washing, gravimetric separation, screening and by flattening the lead grains thereby facilitating their ready recovery.

10 Claims, 3 Drawing Sheets

PROCESS FOR SEPARATING AND RECOVERING LEAD, RUBBER AND COPPER WIRES FROM WASTE CABLES

BACKGROUND AND SUMMARY OF THE INVENTION

The recovery and the separation of useful waste cable components is a problem of worldwide importance in view of the possibility which would be offered, once an effective recovery method became available, to recover and reuse great amounts of valuable materials. Also an acceptable process for separating and recovering these useful waste cable components becomes more important in consideration of the worldwide pollution problems connected with the possible dispersion of such discarded waste cable.

Thus, the object of the present invention is a process which permits separation of the individual useful components of waste cables (i.e. copper, lead and rubber) from the associated waste elements, such as paper, textile threads, and the recovery of said components.

BRIEF DESCRIPTION OF THE DRAWINGS

Referring now to the drawings which form a part of this disclosure.

DETAILED DESCRIPTION OF THE INVENTION

The process for separating and recovering rubber, lead and copper wire from granules of a waste cable material according to the present invention comprises the following sequential steps:

(a) washing the waste cable material to be separated in a water stream to remove lighter polluting elements;

(b) treating the residual waste cable material obtained in (a) with a thick medium to remove rubber which is separated as a light fraction, while a heavy fraction consisting of lead and copper remains;

(c) classifying the remaining heavy fraction obtained in (b) into narrow classes, each having similar granulometries, by means of elliptical vibration screens, wherein granules possessing a granulometry less than 4 mm and coming from step (b), are separated yielding copper, lead and residual mixed product;

(d) flattening of the lead granules contained in each class of mixed product obtained in step (c) by means of a ball mill;

(e) subjecting the heavy fraction to screening by means of shaking vibrating screens, wherein
  (i) the granules having a granulometry ranging from 4 to 10 mm coming from step (b), are thereby separated into lead and copper, and
  (ii) each class of mixed product coming from step (d) is thereby separated into copper, lead and mixed product.

Figure 1:
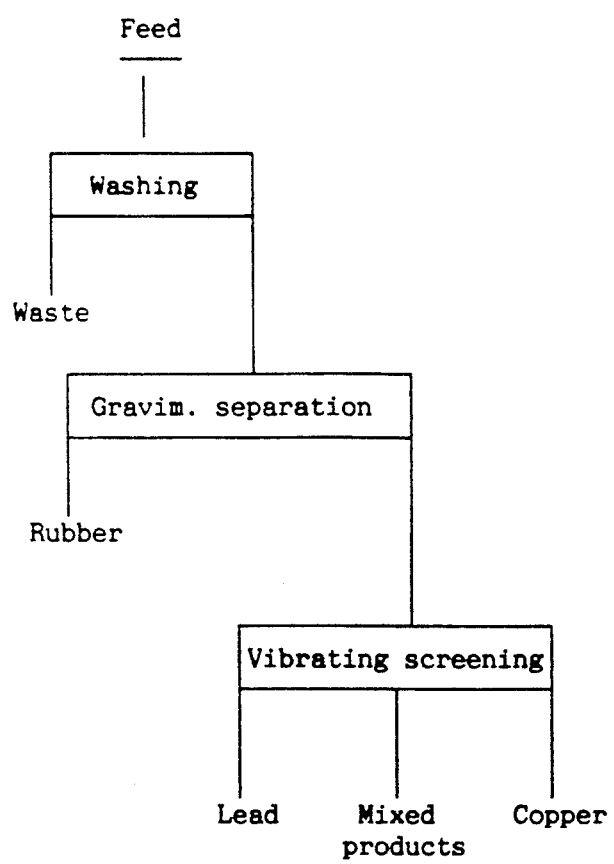
FIG. 1 represents the general sequence of the claimed process.

As one can notice, in consideration of the particular nature and dimensions of the materials to be recovered, an essentially mechanical separation technique has been chosen, the general scheme thereof is shown in FIG. 1.

According to said scheme, the cloth and the other light waste materials are separated by washing in a water stream. The product remaining after washing consists of copper, lead and rubber. The separation of these components is carried out using a thick medium, which preferably consists of water and calcium chloride, the density being equal to 1.1–1.6 kg/l.

Two fractions are so obtained; one fraction having a lower density than the medium and consisting of rubber grains, while the other fraction has a higher density and consists of the copper wires and lead grains. Due to the great difference in density existing between the rubber and the metals, the separation efficiency is very high, with recovery yields above 95%.

The separation of the copper wires from the lead grains in the case of components having a coarse granulometry (i.e., 4–10 mm) is obtained by screening. This is accomplished by accurately selecting the screen mesh size and type of movement of the screen. The screen must be of the shaking vibratory type with an amplitude of vertical movement varying from 0.5 to 30 mm.

The movement amplitude and intensity depend, of course, on the grain size. Upon conclusion of this operation, underneath the screen will be substantially composed of copper wires, while lead grains will remain trapped above the screen ready for separation. Since a part of the copper wires remains entrapped in the screen mesh, after separating the lead grains, it is necessary to carry out a second screening with screen reversed so as to recover all the copper wires and, at the same time, clean the screen.

In the case of components having a fine granulometry (less than 4 mm), the separation is obtained by means of two different types of classification and by means of a process for flattening the lead grains. The mix components are divided into narrow classes by using elliptical vibration screens. Each class is subjected to a lead grains flattening process using a ball-mill. By this process, and by virtue of the different ductility of the two metals considered, a diversification of particle shape is obtained. In fact, the copper wires retain their original shape, while the lead particles are significantly flattened until becoming nearly laminar. Thereafter, the separation by means of a shaking vibrating screen is carried out, as described hereinbefore.

The separation process steps schematically indicated above may be performed, in whole or in part, depending on the specific composition of the material mixture to be treated.

Experimental Part

The process according to the present invention was applied to 5 samples, four of which consisted of rubber, lead and copper wires having a granulometry of 4–10 mm (coarse granulometry) and one consisting of lead grains and copper wires having a lower granulometry (fine granulometry).

Coarse Granulometry Samples

The samples were washed in water in order to separate the very light polluting materials such as paper and cloth. The product was then treated with a thick medium having a density equal to 1.3 and consisting of an aqueous solution of calcium chloride. The supernatant material was composed of rubber and plastics, while the heavy fraction consisted of copper and lead. The so separated products were washed and dried. The lighter fraction represented a finished product, while the mixture of copper and lead was screened by means of vibrating screens having net mesh sizes ranging from 1.5 to 0.7 mm. Underneath the screens consisted of copper wires, while above the screens consisted essentially of lead.

When the operation was repeated with screens reversed, after separating the lead, an almost total recovery of the copper wires and a screen cleaning was obtained.

Figure 2:
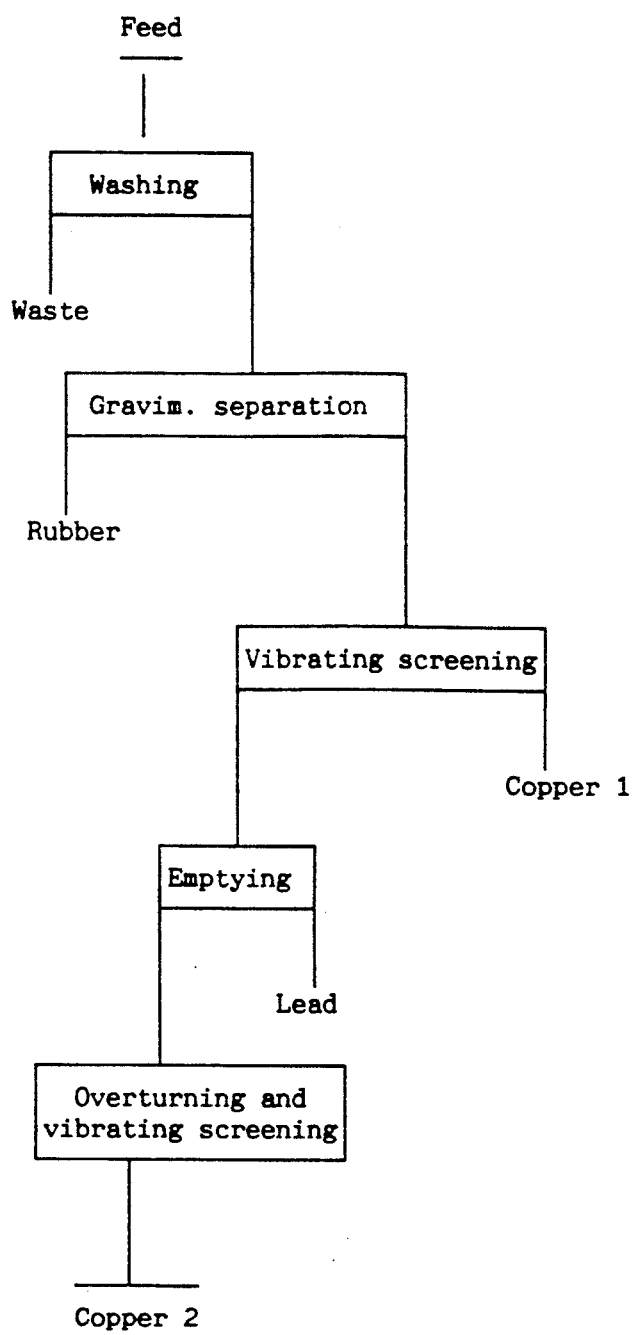
FIG. 2 represents a process variation associated with an experiment conducted using coarse (4–10 mm) granulometry samples.

The process described above is schematically represented in FIG. 2.

Fine Granulometry Sample

Since in this case the sample did not contain rubber, no separation with a thick medium was carried out.

The sample was divided into narrow granulometric classes ranging from 2 to 0.5 mm in order to obtain a higher effectiveness of the treatment.

The fraction above 2 mm constituted a mixed product, while the fraction below 0.5 mm was to be considered as a finished lead product.

The other granulometric classes: 2 to 1.7 mm; 1.7 to 1.4 mm; 1.4 to 1 mm; and 1 to 0.5 mm were separated by means of suitable vibrating screens with treatment times of about 15 minutes.

Products prevailingly consisting of copper or lead and mixed products were so obtained. The mixed products were treated in a ball mill for about 20 minutes and were then subjected again to screening, still obtaining a copper product, a lead product and mixed products. The process can be repeated depending on the necessity and convenience. The mixed products will finally consist of copper wires entrapped by a rubber coating and of copper wires and lead grains, the shape differences of which are very slight; said mixed products can be recycled.

Figure 3:
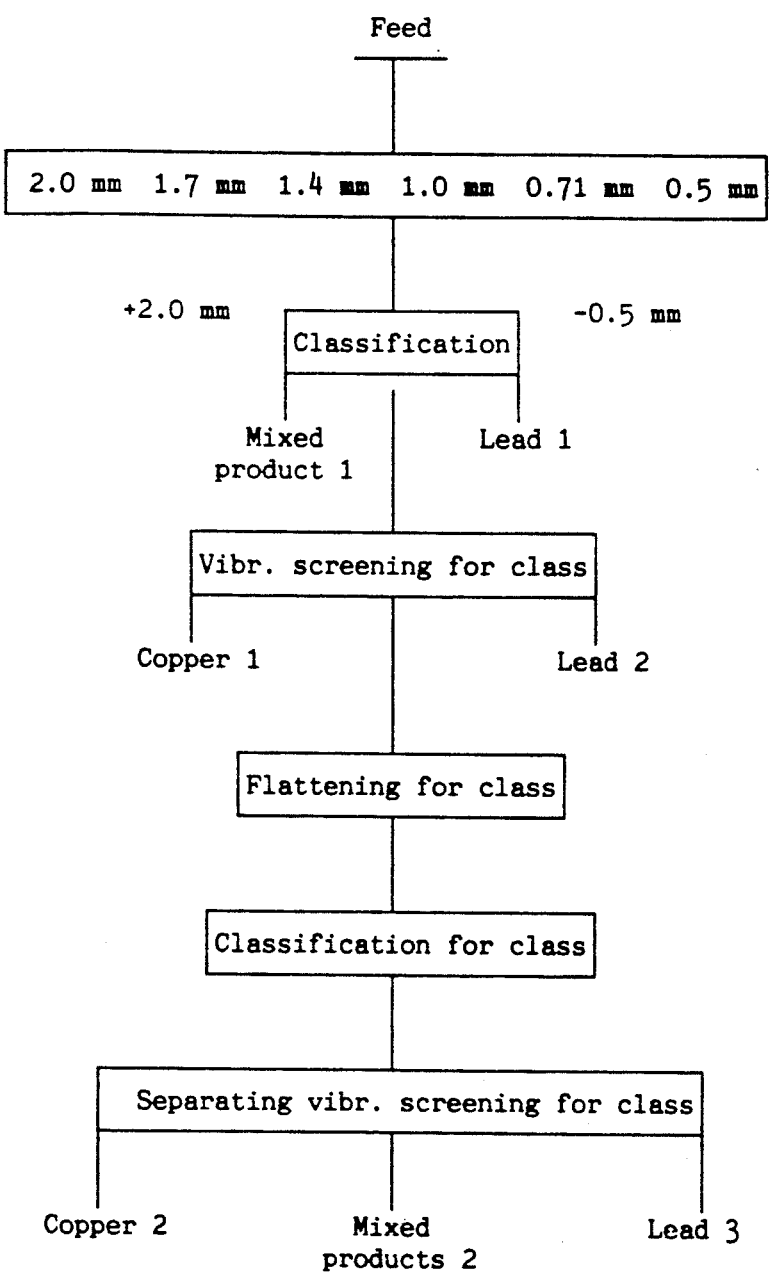
FIG. 3 represents a process variation associated with an experiment conducted using a fine (less than 4 mm) granulometry sample.

The process described above is schematically represented in FIG. 3. Tables I and II show the values relating to the recovery of Cu and of Pb in the coarse grain samples and in the fine grain samples, respectively. The copper product content is expressed as:

Cu % in the product / Cu % in the copper wire
The relative content of the lead product is given by:
(1 - Rel. Cont. of copper product) %.

As is inferable from the indicated data, the process permits a very effective recovery by means of a method easy to practice.

TABLE I

| | | | | Balance of the coarse granulometry sample tests | | | |
|---|---|---|---|---|---|---|---|
| Product name | Weight % | Content % | | Rel. Cont. % | | Rel. Recovery % | |
| | | Cu | Pb | Copper | Lead | Copper | Lead |
| Copper | 60.22 | 90.02 | 9.98 | 91.91 | 8.09 | 92.88 | 12.06 |
| Pb 1 | 12.77 | 6.30 | 93.70 | 6.43 | 93.57 | 1.38 | 29.57 |
| Pb 2 | 27.01 | 12.44 | 87.56 | 12.70 | 87.30 | 5.74 | 58.37 |
| Feed | 100.0 | 58.37 | 41.63 | 59.59 | 40.41 | 100.0 | 100.0 |

TABLE II

| | | | | Balance of the fine granulometry sample test | | | |
|---|---|---|---|---|---|---|---|
| Product name | Weight % | Content % | | Rel. Cont. % | | Rel. Recovery % | |
| | | Cu | Pb | Copper | Lead | Copper | Lead |
| Copper | 28.25 | 87.86 | 12.14 | 87.81 | 10.29 | 59.21 | 5.08 |
| Lead | 39.30 | 14.2 | 85.80 | 14.50 | 85.50 | 13.31 | 58.74 |
| Mixed Products | 32.48 | 35.51 | 64.49 | 36.27 | 63.73 | 27.48 | 36.18 |
| Feed | 100.0 | 41.92 | 58.08 | 42.80 | 57.20 | 100.0 | 100.0 |

We claim:

1. A process for separating and recovering rubber, lead and copper wire from granules of a waste cable material comprising the steps of:
   (a) washing the granules of the waste cable material to be separated in a water stream to remove lighter polluting elements from residual waste cable product;
   (b) treating the residual waste cable product obtained in step (a) with a thick medium to remove rubber which is separated as a light fraction, while a heavy fraction remains of lead and copper in a residual mixed product;
   (c) classifying the remaining heavy fraction obtained in step (b) into narrow classes of residual mixed products, each class having similar granulometries, by means of elliptical vibrating screens, wherein granules possessing a granulometry less than 4 mm are separated yielding copper granules and lead granules in a residual mixed product;
   (d) flattening the lead granules contained in each class of residual mixed product obtained in step (c) by means of a ball mill; and
   (e) subjecting the heavy fraction to screening by means of shaking vibrating screens, wherein
      (i) the residual mixed product from step (b) having a granulometry ranging from 4 to 10 mm are thereby separated into lead and copper, and
      (ii) each class of residual mixed product from step (d) is thereby separated into copper, lead and mixed product.

2. A process according to claim 1, wherein the lighter polluting elements of step (a) consist essentially of cloth.

3. A process according to claim 1, wherein the thick medium has a density range of 1.1 to 1.6 kilograms per liter.

4. A process according to claim 1, wherein the thick medium consists of a solution of calcium chloride having a density range of 1.1 to 1.6 kilograms per liter.

5. A process according to claim 1, wherein the narrow classes obtained in step (c) are in a thickness range of 2 to 0.5 mm.

6. A process according to claim 1, wherein the narrow classes obtained in step (c) can be separated according to thickness ranges of 2 to 1.7 mm; 1.7 to 1.4 mm; 1.4 to 1 mm; and 1 to 0.5 mm.

7. A process according to claim 1, wherein in step (e) the granules coming from step (b) having a granulometry ranging from 4 to 10 mm are subjected to screening by means of a shaking vibrating screen with a vertical amplitude of 0.5 to 30 mm.

8. A process according to claim 1, wherein in step (e) the granules coming from step (b) having a granulometry ranging from 4 to 10 mm are subjected to screening by means of a shaking vibrating screen with a net mesh size of 1.5 to 0.7 mm.

9. A process according to claim 1, wherein step (e) is repeated by conducting a second screening with reversed screens.

10. A process according to claim 1, wherein the mixed product, obtained in step (e) after separating the copper and lead granules, is further recycled.

* * * * *